(12) United States Patent
Kim et al.

(10) Patent No.: US 8,727,170 B2
(45) Date of Patent: May 20, 2014

(54) COVER LOCKING DEVICE FOR PORTABLE TERMINAL

(75) Inventors: Jae-Shik Kim, Gyeonggi-do (KR); Wook-Dam Jeong, Gyeonggi-do (KR); Taek-Soo Kwon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 80 days.

(21) Appl. No.: 13/287,379

(22) Filed: Nov. 2, 2011

(65) Prior Publication Data

US 2012/0118892 A1 May 17, 2012

(30) Foreign Application Priority Data

Nov. 12, 2010 (KR) .......................... 10-2010-0112437

(51) Int. Cl.
*B65D 45/00* (2006.01)
*B65D 45/16* (2006.01)

(52) U.S. Cl.
USPC .......................................... 220/324; 220/315

(58) Field of Classification Search
USPC ................................ 220/324, 326, 315, 4.02
See application file for complete search history.

(56) References Cited

U.S. PATENT DOCUMENTS

| | | | | | |
|---|---|---|---|---|---|
| 4,921,122 | A | * | 5/1990 | Bornstein et al. | 220/326 |
| 5,307,511 | A | * | 4/1994 | Takahashi | 455/351 |
| 5,908,131 | A | * | 6/1999 | Yamaguchi | 220/324 |
| 6,535,380 | B1 | * | 3/2003 | Lee et al. | 361/679.27 |
| 6,663,148 | B2 | * | 12/2003 | Bonora et al. | 292/159 |
| 7,370,772 | B2 | * | 5/2008 | Brunson | 220/326 |
| 8,100,281 | B2 | * | 1/2012 | Sands et al. | 220/326 |
| 2007/0269712 | A1 | * | 11/2007 | Ju | 429/97 |
| 2010/0018973 | A1 | * | 1/2010 | Belden et al. | 220/212 |
| 2011/0100992 | A1 | * | 5/2011 | Zhang et al. | 220/324 |
| 2011/0195292 | A1 | * | 8/2011 | Ouyang | 429/100 |

FOREIGN PATENT DOCUMENTS

KR 10-0630186 9/2006

* cited by examiner

*Primary Examiner* — Mickey Yu
*Assistant Examiner* — Niki Eloshway
(74) *Attorney, Agent, or Firm* — Cha & Reiter, LLC

(57) ABSTRACT

A locking device for a portable terminal includes a body; a battery cover; and a locking unit for allowing the battery cover to be selectively attached or detached from the bottom of the body, wherein a locked or locking-released position of the battery cover provided by the locking unit is located to be concealed within the interior of the body, so that the locked or locking-released position is not exposed to the outside.

4 Claims, 6 Drawing Sheets

COVER LOCKING DEVICE FOR PORTABLE TERMINAL

CLAIM OF PRIORITY

This application claims the priority under 35 U.S.C. §119(a) of an application entitled "Cover Locking Device For Portable Terminal" filed in the Korean Intellectual Property Office on Nov. 12, 2010 and assigned Serial No. 10-2010-0112437, the contents of which are hereby incorporated by reference.

BACKGROUND OF THE INVENTION

1. Field of the Invention

The present invention relates to a portable terminal including a cellular phone, a smart phone, a PMP, an MP3 player, a web pad, a tablet PC, or the like, in particular to a cover locking device, and more particularly to a battery cover locking device for such a portable terminal.

2. Description of the Related Art

In general, a portable terminal including a cellular phone, a smart phone or the like is provided with a battery power supply that is configured to be detachable from or embedded in the body of such a portable terminal for the purpose of recharging. In addition, a battery cover is detachably mounted on the body, so that the embedded battery is rechargeable for use.

The portable terminal is typically provided with a locking device for allowing the battery cover to be attached or detached.

As shown in FIGS. 1 to 3, a battery (not shown) and a battery cover 110 are mounted on the bottom end of a portable terminal body 100. In order to remove the battery, the battery cover 110 must be released from its locked condition. Such a locking device has a slide knob 121 which is moved by force applied by a user to allow the battery cover 110 to be detached. The slide knob 121 is arranged to be exposed to the outer surface of the battery cover 110, thereby allowing the user's forcible manipulation. When moved to left or right, the battery cover 110 is either locked to the body 100 or released the battery cover 110 from its locked condition.

FIG. 2 shows the locking-released state of the battery cover 110, and FIG. 3 shows the locked state of the battery cover 110. In the locked state of the battery cover 110, a groove provided on a locker and a protrusion provided on the battery cover 110 are engaged with each other, thereby preventing the release of the battery cover 110. In the locking-released state, the battery cover 110 can be released when the protrusion 114 is fully released from the groove.

However, as shown in FIG. 1, the conventional locking device has a problem in that the cover 114 ("A" area) is exposed to the outside during lock and release modes which deteriorates the external appearance of the portable terminal. Although the bottom of such a potable terminal is available for locking device, a more simple and elegant appearance of the terminal bottom has become important for many users.

Moreover, since above conventional cover locking device has a configuration allowing its protrusion to be entirely exposed to the exterior, the external appearance and function may be damaged as the locker is repeatedly used over time. In addition, such a protrusion forms a severely uneven area on the external appearance, which may cause crawling when applying a coating material. Furthermore, such a conventional cover locking device is formed on a corresponding cover, which increases the thickness of the cover.

Therefore, what is needed is a locking device that can contribute to the sliming of a portable terminal while providing an elegant appearance to an external appearance of a portable terminal, especially at the bottom area where the locking device is provided.

SUMMARY OF THE INVENTION

Accordingly, the present invention has been made to solve the above-mentioned problems occurring in the prior art and provides additional advantages, by providing a cover locking device for a portable terminal, in which a locking position is positioned within the interior of the portable terminal so that the locking position cannot be seen by a user, thus providing a more esthetically pleasing appearance.

Another aspect of the present invention provides a cover locking device which makes the external appearance of a portable terminal, in particular the bottom of the portable terminal and the battery cover more elegant.

Another aspect of the present invention provides a cover locking device for a portable terminal which provides a more slim appearance to the battery cover for the portable terminal.

Another aspect of the present invention provides a cover locking device, in particular a battery cover locking device with an improved durability.

In accordance with an aspect of the present invention, a locking device for a portable terminal includes: a body; a battery cover; and a locking unit for allowing the battery cover to be selectively attached or detached to and from the body, wherein a locked or locking-released position of the battery cover provided by the locking unit is located to be concealed within the interior of the body, so that the locked or locking-released position is not exposed to the outside.

In accordance with another aspect of the present invention, a locking device for a portable terminal includes: a body; a battery cover; and a locking unit for allowing the battery cover to be selectively attached or detached to and from the body, the locking unit including: one or more catching parts formed on the cover; and a locker having one or more recesses, and one or more catching ridges, wherein the locker is adapted to be engaged with or disengaged from the catching parts depending on its slide movement, thereby allowing the cover to be attached to or detached from the body.

In accordance with yet another aspect of the present invention, a housing having a locking device for a portable terminal includes: a body; a battery cover having one or more catching parts formed therefrom; and a locking unit having one or more catching ridges and disposed between the body and battery cover, wherein the one or more catching ridges of the locking unit engages with the one or more catching parts of the battery cover according to a sliding movement of the locker for selectively attach or detach to and from the body.

BRIEF DESCRIPTION OF THE DRAWINGS

The above and other aspects, features and advantages of the present invention will be more apparent from the following detailed description taken in conjunction with the accompanying drawings, in which:

FIG. 7b is a side view of FIG. 7a;

FIG. 8b is a side view of FIG. 8a;

DETAILED DESCRIPTION

Figure 1:
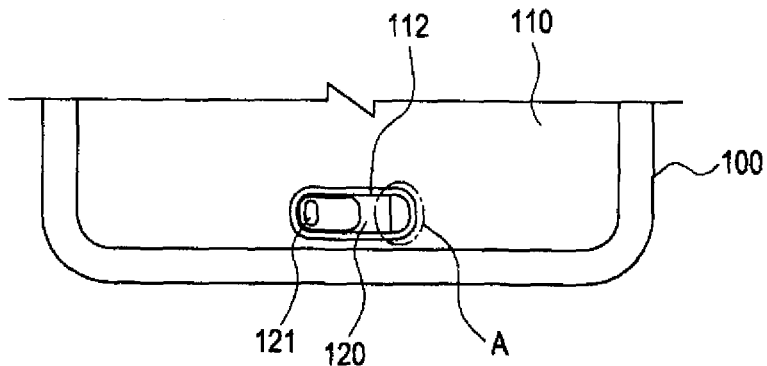
FIG. 1 is a plan view showing a battery cover locking device of a conventional portable terminal.
Figure 2:
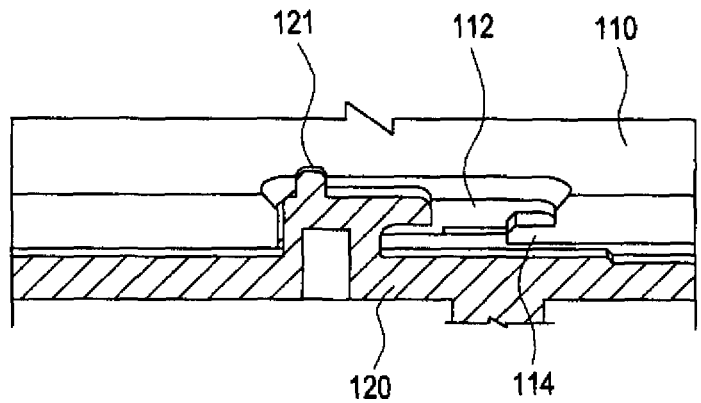
FIG. 2 is a cross-sectional view showing the locking-released condition of the conventional battery cover.
Figure 3:
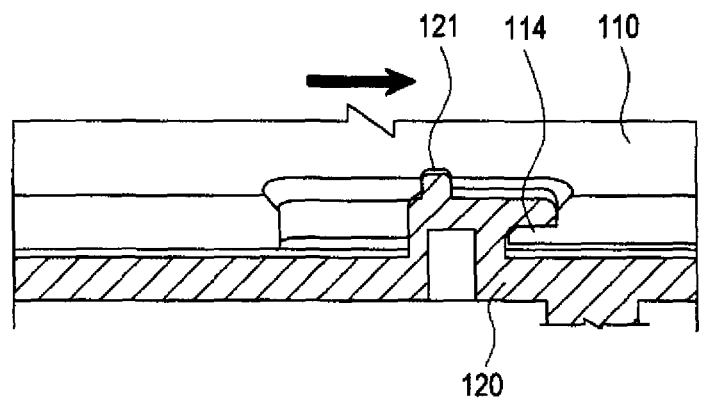
FIG. 3 is a cross-sectional view showing the locked condition of the conventional battery cover.

Hereinafter, embodiments of the present invention will be described with reference to the accompanying drawings. For the purpose of clarity and simplicity, the same elements will be designated by the same reference numerals although they are shown in different drawings.

Figure 4:
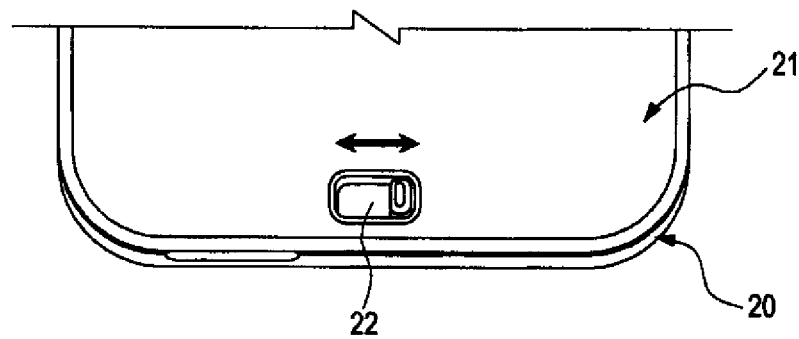
FIG. 4 is a plan view showing the inventive cover locking device of a portable terminal.
Figure 5:
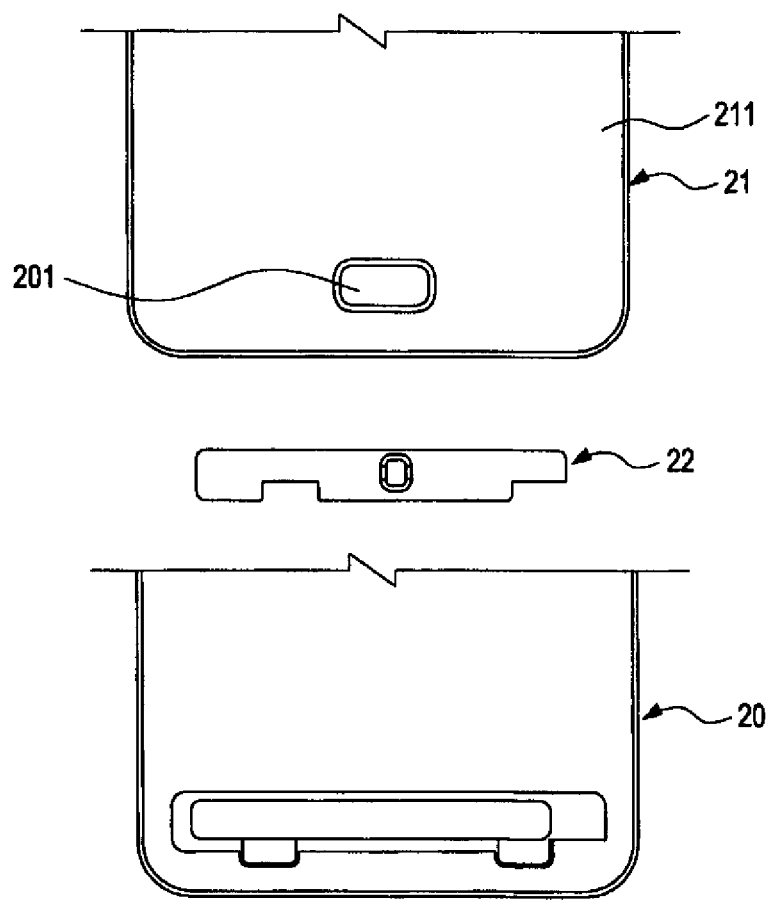
FIG. 5 is an exploded plan view showing the configuration of the inventive cover locking device of FIG. 3.

Referring to FIGS. 4 and 5, the locking device according to the embodiment of the present invention includes a body 20, a cover 21, and a locker 22 for allowing the cover 21 to be attached to or detached from the body 20, wherein the inventive locking device is adapted to conceal the locked position and the locking-released position of the cover 21 within the interior of the body 20 in such a manner that the positions are not exposed to the outside. In addition, the locking device is arranged between the inner side of the body 20 and the inner side of the cover 21, which allows its locking position not to be exposed to the external environment, so that the locking device can be protected from the external environment. Further, the inventive locking device is preferably employed as a locking device for a cover for a portable terminal. That is, the inventive locking device as shown in FIGS. 4 and 5 may be employed as a locking device of a cover in a portable terminal, including a cellular phone, a smart phone, a PMP, an MP3 player, a web pad, a tablet PC or the like.

Now, the present invention will be described with reference to a embodiment in which the inventive locking device is employed in a battery cover.

As shown in FIG. 4, a slide knob 220 (see FIG. 7) of the locker 22 is exposed to exterior. If the slide knob 220 is moved left, the cover 21 is released from its locked condition, and if the slide knob 220 is moved to the right, the cover 21 is locked. If the cover 21 is released from its locked condition, a user can remove a battery (not shown) from the inside body of the portable terminal, and recharge the battery.

As shown in FIG. 5, the inventive locking device includes a body 20, a cover 21, and a locking unit, in particular a locker 22, interposed between the body 20 and the cover 21, so that the cover 21 can be attached to or detached from the body through a user's simple manipulation of the locker 22. The locker 22 is slidably arranged between the body 20 and the cover 21 to provide a locking mechanism with the body 20 and the cover 21. Reference number 201 denotes guide opening formed with cover.

As shown in FIGS. 6 to 8b, the inventive locking device includes a locker 22, which has one or more catching parts 214, 216, one or more openings 221, 222, and one or more catching ridges 223 and 224, wherein the rocker 22 allows the cover 21 to be attached to or released from the body 20 depending on whether it is moved or not. For example, in FIG. 6, the X-axis indicates the sliding direction of the rocker 22, and the Y-axis indicates a forward or backward direction from the body 20, and the Z-axis indicates a vertically upward or downward direction from the body 20.

Figure 6:
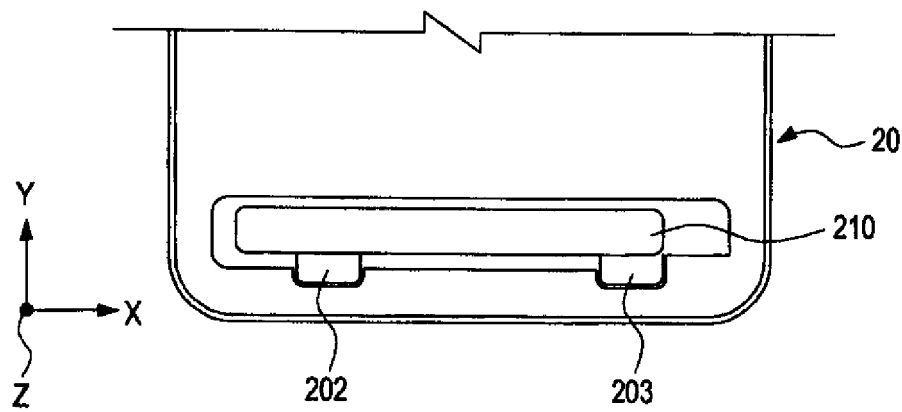
FIG. 6 is a plan view showing the bottom side of the body of the inventive cover locking device.
Figure 8A:
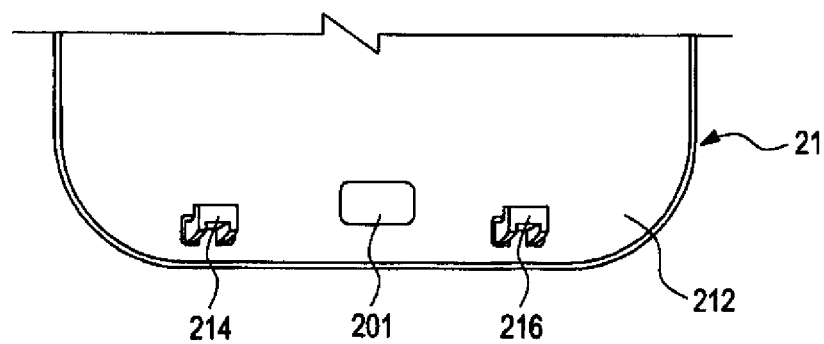
FIG. 8a is a perspective view showing catching parts formed on the front side of the cover of the inventive cover locking device.
Figure 8B:
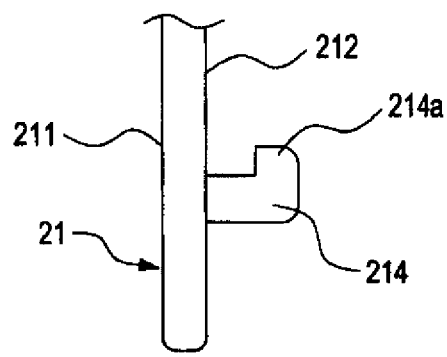
Figure 9:
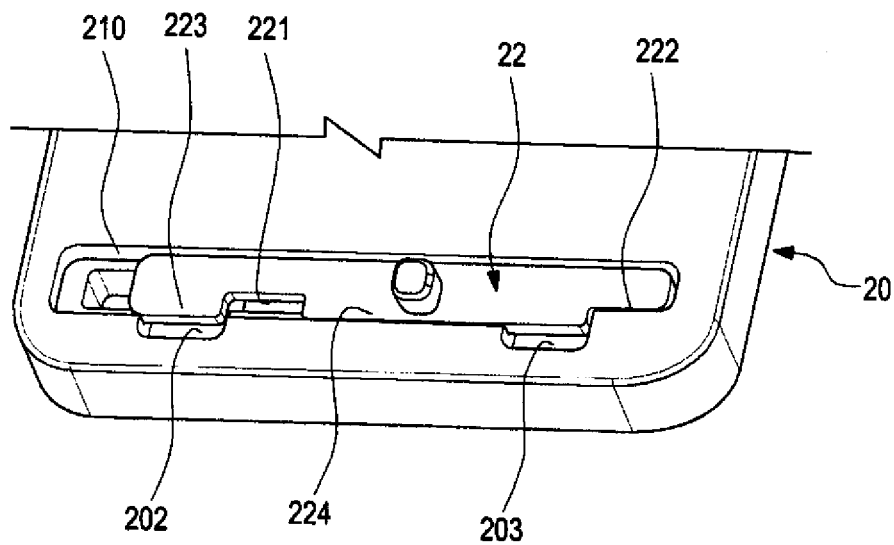
FIG. 9 is a perspective view showing a locker laid on the bottom side of the body of the inventive cover locking device.

As shown in FIGS. 6, 8b and 9, the body 20 has a sliding guide opening 210 extending in the X-axis direction in a predetermined area to allow the rocker to be linearly slid in a restrained condition. The sliding guide opening 210 extends left and right to be somewhat longer than the length of the locker 22. With such an arrangement, the locker 22 is seated in the sliding guide opening 210 to be safely slid by the user. The sliding guide opening 210 is provided with one or more indentations formed at a side thereof, which include first and second recesses 202 and 203 which are opposite to each other, wherein the catching parts 214 and 216 formed on the cover are located/disposed in the first and second recesses 202 and 203, respectively. The first and second recesses 202 and 203 extend toward the front side of the body 20 and the ends 214a of the catching parts 214 and 215 are engaged with the first and second recesses 202 and 203, respectively. The first and second recesses 202 and 203 are formed to have an identical shape with the same depth.

Figure 7A:
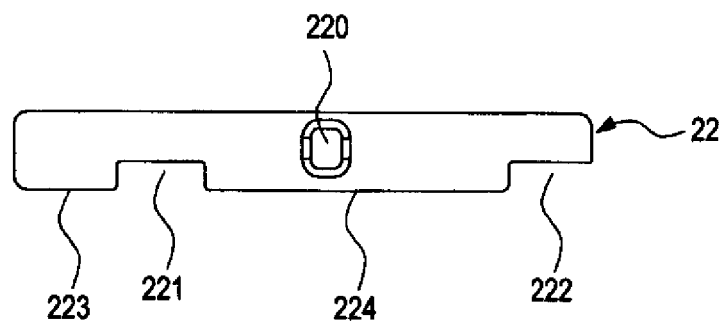
FIG. 7a is a plan view showing the locker of the inventive cover locking device.
Figure 7B:
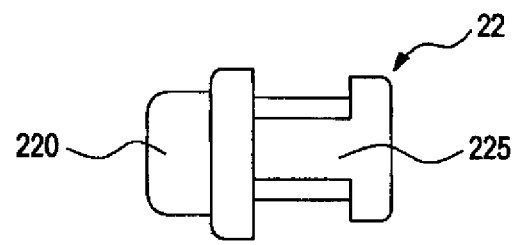

As shown in FIGS. 7a and 7b, the locker 22 has an elongated shape, and is located in the sliding guide opening 210 to be slid left and right by the user's force. The locker 22 is exposed to the exterior, and it has a slide knob 220 protruding vertically upward on the top side, and a locking body 225 formed on the bottom side. The locker 22 has one or more openings 221 and 222, which include first and second openings 221 and 222 positioned opposite to each other. One of the first and second catching ridges 223 and 224 is positioned adjacent to one of the first and second openings 221 and 222, and the other is positioned between the first and second openings 221 and 222. The first and second openings 221 and 222 are opened toward the rear side of the body 20, and the first and second catching ridges 223 and 224 extend toward the front side of the body 20.

As shown in FIGS. 8a, 8b and 9, the cover 21 is a battery cover, which is formed with one or more catching parts 214 and 216 extending vertically downward. The catching parts 214 and 216 are formed in a pair, and the end 214a of each of the catching parts 214 and 216 is formed in a hook shape oriented to the rear side of the body 20. If the cover 21 is locked to body 20, the catching parts 214 and 216 are located in the first and second indentations 202 and 203, respectively, so that the ends 214a are located below the catching ridges 223 and 224, respectively. As the locker 22 is moved, the body 20 is locked to or released from the cover 21. That is, if the first and second catching ridges 223 and 224 are located at the ends of the catching parts 214 and 216, respectively, the cover 21 is in the locked condition, thereby being anchored to the body 20. If the first and second openings 221 and 222 are positioned opposite to the first and second catching parts 214 and 216, the cover 21 is in the locking-released condition. That is, the catching parts 214 and 216 are in a condition to be releasable from the first and second openings 221 and 222, respectively, so that the cover 21 can be separated from the body 20. The cover 21 is formed with a slide opening 210, through which the slide knob is exposed to the outside, so that the user can manipulate the slide knob.

Figure 10A:
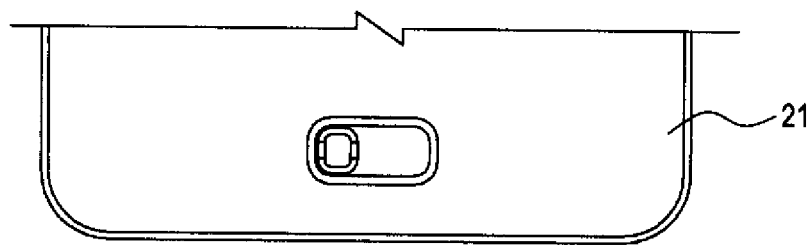
FIG. 10a is a plan view showing the locking-released condition of the inventive cover locking device.
Figure 10B:
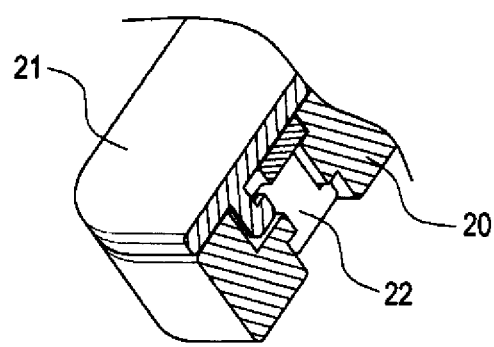
FIG. 10b is a perspective view showing the internal configuration of the cover locking device of FIG. 10a partially in cross-section.
Figure 11A:
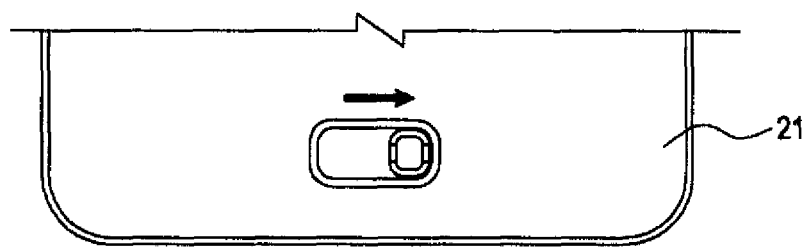
FIG. 11a is a plan view showing the locking condition of the inventive cover locking device.
Figure 11B:
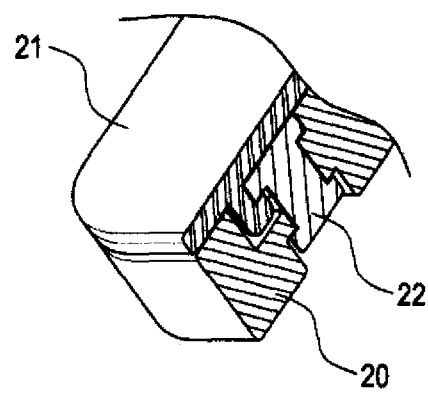
FIG. 11b is a perspective view showing the inner configuration of the cover locking device of FIG. 11a partially in cross-section.

FIGS. 10a and 10b show a state in which the cover 21 is released from its locked state so that the cover 21 can be separated from the body 20. FIGS. 11a and 11b show a state in which the cover 21 is locked to the body 20 so that the cover 21 cannot be separated from the body 20.

The bottom side of the cover 21, the top side of the locker 22, and the bottom side of the body are arranged to be in contact with each other face to face, and the locker 22 is adapted to be tightly slid in a state in which it is restrained between the cover 21 and the body 20 to be parallel to them so as to allow the cover to be locked to or released from the body 20.

As described above, since the inventive locking device is concealed within the body of a portable terminal and not protruding out of the casing, the external appearance of a portable terminal, in particular the external appearance of the bottom of the body of the portable terminal, and more particularly the external appearance of the battery cover of the portable terminal can be more elegant. In addition, the inventive locking device can contribute to the sliming of a battery cover, and can improve durability since its locking arrangement is protected from the external environment.

While the invention has been shown and described with reference to certain embodiments thereof, it will be understood by those skilled in the art that various changes in form and details may be made therein without departing from the spirit and scope of the invention as defined by the appended claims.

What is claimed is:

1. A housing having a locking device for a portable terminal, comprising:
   a body;
   a cover having one or more catching parts formed thereon at a fixed location protruding from the cover; and
   a locking unit for allowing the cover to be selectively attached or detached from the body, the locking unit including:
   a locker having one or more openings, and one or more catching ridges wherein the locker is slidable in a lateral direction with respect to the body and wherein the catching ridges are arranged along a line that is parallel to the lateral direction, wherein the openings of the locker are face the rear side of the body, the catching ridges extends toward the front side of the body, so that one of the catching ridges is arranged between the openings, a sliding guide opening formed on the bottom side of the body, the locker being slid along the sliding guide opening in a restrained state,
   one or more recesses formed to be opened to the sliding guide opening, the recesses extending toward the front side of the body, and the ends of the catching ridges being engaged with the recesses, respectively, and
   wherein the locker is adapted to be engaged with or disengaged from the catching parts depending on a slide movement of the locker, thereby allowing the cover to be attached to or detached from the body.

2. The housing as claimed in claim 1, wherein the catching parts are formed in one pair and extend vertically downward from the bottom of the over, each end of the catching parts having a hook shape and oriented toward the rear side of the body.

3. The housing as claimed in claim 1, wherein the bottom side of the cover, the top side of the locker, and the bottom side of the body are arranged to be in contact with each other face to face, and the locker is adapted to be tightly slid in a state in which it is restrained between the cover and the body to be parallel to them.

4. The housing as claimed in claim 1, wherein the cover is formed as a battery cover.

\* \* \* \* \*

UNITED STATES PATENT AND TRADEMARK OFFICE
CERTIFICATE OF CORRECTION

| | | |
|---|---|---|
| PATENT NO. | : 8,727,170 B2 | |
| APPLICATION NO. | : 13/287379 | |
| DATED | : May 20, 2014 | |
| INVENTOR(S) | : Jae-Shik Kim et al. | |

It is certified that error appears in the above-identified patent and that said Letters Patent is hereby corrected as shown below:

On the title page, Item 75, 2nd inventor should read as follows:
--...Wook-Dam Jung...--

Signed and Sealed this
Fifteenth Day of July, 2014

Michelle K. Lee
*Deputy Director of the United States Patent and Trademark Office*